UNITED STATES PATENT OFFICE.

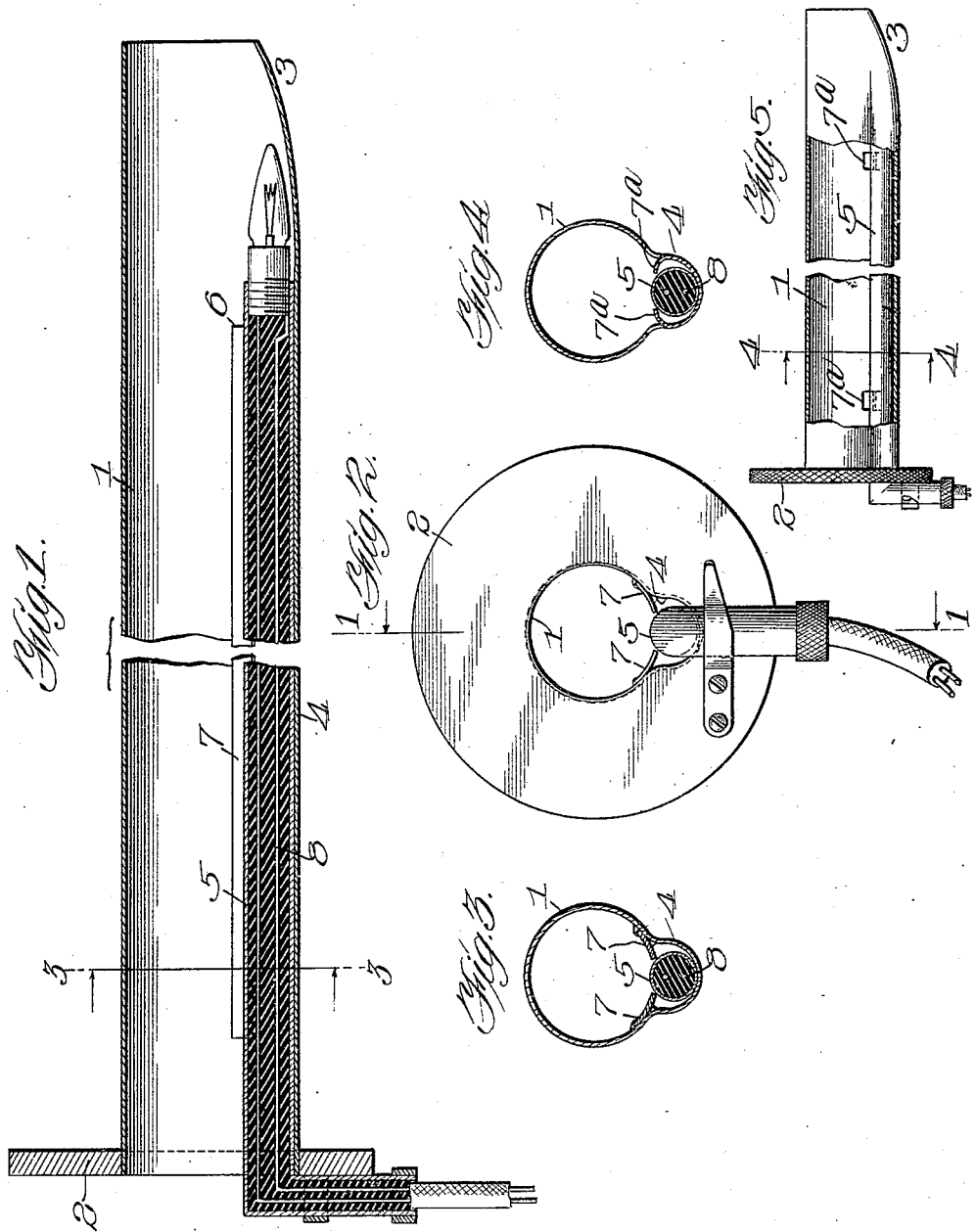

WILLIAM MEYER, OF CHICAGO, ILLINOIS.

SPECULUM.

951,285. Specification of Letters Patent. Patented Mar. 8, 1910.

Application filed June 4, 1909. Serial No. 500,181.

*To all whom it may concern:*

Be it known that I, WILLIAM MEYER, a citizen of the United States, and a resident of Chicago, in the county of Cook and State of Illinois, have invented certain new and useful Improvements in Speculums, of which the following is a specification.

This invention relates to tubular speculums of the general type shown in the United States patents to Nitze, 218,055, July 29, 1879, or Preston, 636,213, October 11, 1899, adapted to examination and treatment of the urethra and other orifices, and it has for its object to gain more available space or sight area relatively to the size of the tube, while still employing a removable electric lamp for illuminating the inner or working end of the tube from one side, and also to facilitate cleaning. To these ends I construct the guide for the removable lamp carrier as a longitudinal offset of the main tube, open thereinto throughout the entire length, but just sufficiently passing the semi-circle in cross section to grip the edges of the lamp carrier and hold it, with the lamp, from sagging or falling into the sight area.

In the drawings—Figure 1 is a central longitudinal section, on line 1—1 of Fig. 2 through apparatus embodying my invention; Fig. 2, an elevation taken from the outer end thereof; Fig. 3, a cross section taken on the correspondingly numbered line in the first figure; Fig. 4, a similar cross section on the line 4—4 of Fig. 5, and Fig. 5 a fragmentary view, explaining a modification.

Referring now to said drawings, the numeral 1 denotes the main chamber or tube of the speculum, having the usual disk 2 at its rear or outer end, somewhat incurved or rounded at its forward end 3 to facilitate insertion, and preferably cylindrical in major outline. Beneath, or to one side of this larger or sight tube is a smaller tube or guideway 4, joined to the main tube by a narrow open neck 5 extending practically its entire length, from the disk 2 at the outer end to a point 6 adjacent to the inner end but falling slightly short thereof to leave an open space for the action of the lamp, the conjoined tubes being pear-shaped in cross section or forming a sort of open figure 8 with one loop smaller than the other. The neck between the two tubes is of sufficient width to permit both to be cleaned at one operation and by one instrument, but still so narrow as to leave the main tube with an outline nearly approximating the complete cylindrical and the smaller tube exceeding the semi-cylindrical just enough to form longitudinal lips or ledges 7 between the two tubes to grip and hold the lamp carrier 8 from falling or sagging into the main tube or sight area when inserted. The cross-sectional outline of this lamp carrier 8 will of course be made to fit its guideway and be held apart from the sight area thereby, but the outline, whether cylindrical or otherwise, should be such as not to materially project into or obstruct the sight and operating area, the guideway itself conforming to such outline.

Instead of forming the lips or ledges 7 continuous with the length of the guideway, they may be formed as detached keepers 7ª suitably spaced apart, as shown in the modified form depicted in Fig. 5, but the continuous ledge may be preferable for cleaning purposes as it permits the cleaning instrument a clear and unobstructed sweep.

Having thus described my invention, what I claim and desire to secure by Letters Patent of the United States is:

1. A speculum comprising a main tube and a smaller guide tube opening into the former continuously from the outer end to the lamp-area at the inner end, through a constricted longitudinal neck, adapted to retain a removable lamp carrier.

2. A speculum comprising a main tube and a smaller guide tube connected with the former by a longitudinal open neck provided with keepers, extending from the outer end to the lamp-area at the inner end, combined with a lamp carrier adapted to be inserted into said guide tube and held therein by said keepers.

WILLIAM MEYER.

Witnesses:
EDWARD V. PETERSON,
JOS. A. MCKEARNEY.